US012567942B2

(12) United States Patent
Ota et al.

(10) Patent No.: US 12,567,942 B2
(45) Date of Patent: Mar. 3, 2026

(54) VEHICLE CONTROL SYSTEM AND ABNORMALITY DIAGNOSIS METHOD

(71) Applicant: TOYOTA JIDOSHA KABUSHIKI KAISHA, Toyota (JP)

(72) Inventors: Hiroshi Ota, Nagoya (JP); Yasuhiro Yamasaki, Nisshin (JP); Kenichiro Hayashi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 307 days.

(21) Appl. No.: 18/475,583

(22) Filed: Sep. 27, 2023

(65) Prior Publication Data

US 2024/0195598 A1     Jun. 13, 2024

(30) Foreign Application Priority Data

Dec. 8, 2022     (JP) ................................. 2022-196320

(51) Int. Cl.
H04L 7/00          (2006.01)
H04L 7/02          (2006.01)

(52) U.S. Cl.
CPC .............. H04L 7/0016 (2013.01); H04L 7/02 (2013.01)

(58) Field of Classification Search
CPC ................................ H04L 7/0016; H04L 7/02
See application file for complete search history.

(56) References Cited

U.S. PATENT DOCUMENTS 9,876,629 B2 * 1/2018 Ogawa .................. H04J 3/0688
12,204,291 B2 * 1/2025 Arai ....................... G04G 5/002

12,309,726 B2 * 5/2025 Patil ........................ H04W 4/40
2007/0274349 A1 11/2007 Emori
2009/0086764 A1 * 4/2009 Lee .......................... H04L 69/28
                                                              370/503
2019/0363815 A1 11/2019 Bogenberger et al.
2024/0380507 A1 11/2024 Kurata

FOREIGN PATENT DOCUMENTS

JP       2007-226389 A      9/2007
JP       2016-034065 A      3/2016
JP       2020-526051 A      8/2020
JP       2021-106328 A      7/2021
JP            7123228 B1     8/2022

* cited by examiner

*Primary Examiner* — Chandrahas B Patel

(74) *Attorney, Agent, or Firm* — SoraIP, Inc.

(57)          ABSTRACT

The vehicle control system includes an abnormality diagnosis unit for determining whether a synchronization abnormality between a master ECU and a slave ECU has occurred. The abnormality diagnosis unit transmits and receives a signal between the master ECU and the slave ECU and acquires time information. The slave ECU calculates a delay time of transmission based on the acquired time information. Then, the abnormality diagnosis unit first determines whether or not there is a periodic shift. When determining that there is no periodic deviation, the abnormality diagnosis unit determines whether or not there is an offset deviation based on the difference obtained by subtracting the delay time from the second time and the first time. The abnormality diagnosis unit determines that a synchronization abnormality has occurred when it is determined that there is a periodic deviation or when it is determined that there is the offset deviation.

5 Claims, 5 Drawing Sheets

VEHICLE CONTROL SYSTEM AND ABNORMALITY DIAGNOSIS METHOD

CROSS-REFERENCE TO RELATED APPLICATION

This application claims priority to Japanese Patent Application No. 2022-196320 filed on Dec. 8, 2022, incorporated herein by reference in its entirety.

BACKGROUND

1. Technical Field

The present disclosure relates to a vehicle control system and an abnormality diagnosis method.

2. Description of Related Art

Japanese Unexamined Patent Application Publication No. 2007-226389 (JP 2007-226389 A) discloses an abnormality detection device that detects a deviation of time information in a plurality of devices connected via a network.

SUMMARY

In a vehicle control system, a plurality of electronic control units is connected to each other via a network. In the vehicle control system, advanced vehicle control is implemented by cooperation of the electronic control units. Therefore, the vehicle control system needs to monitor whether an abnormality has occurred in the synchronization of the time information among the electronic control units. The process for the determination on the synchronization abnormality is repeatedly executed in parallel with the vehicle control process. Therefore, there is a demand to minimize a processing load.

Means for solving the above problem and actions and effects will be described below. A vehicle control system for solving the above problem includes a master electronic control unit configured to output first time information serving as a reference, and a plurality of slave electronic control units connected to the master electronic control unit via a network. In the vehicle control system, the master electronic control unit and the slave electronic control units are configured to control a vehicle in cooperation. The vehicle control system includes an abnormality diagnosis unit configured to determine whether a synchronization abnormality has occurred between the first time information and second time information that is time information in each of the slave electronic control units. The vehicle control system is configured to cause the master electronic control unit and each of the slave electronic control units to transmit and receive signals to acquire a first time that is the first time information when the master electronic control unit transmits a first signal to the slave electronic control unit, a second time that is the second time information when the slave electronic control unit receives the first signal, a third time that is the second time information when the slave electronic control unit transmits a second signal to the master electronic control unit in response to reception of the first signal, a fourth time that is the first time information when the master electronic control unit receives the second signal, a fifth time that is the first time information when the master electronic control unit transmits a third signal to the slave electronic control unit in response to reception of the second signal, and a sixth time that is the second time information when the slave electronic control unit receives the third signal. The vehicle control system is configured to calculate a delay time of transmission between the master electronic control unit and the slave electronic control unit based on the third time, the fourth time, the fifth time, and the sixth time. The abnormality diagnosis unit is configured to determine whether a periodic deviation that is a deviation between a clock period in the master electronic control unit and a clock period in the slave electronic control unit is present based on a processing period in the master electronic control unit that is a difference obtained by subtracting the previously acquired first time from the current first time, and a processing period in the slave electronic control unit that is a difference obtained by subtracting the previously acquired second time from the current second time. The abnormality diagnosis unit is configured to determine whether an offset deviation is present based on the first time and a difference obtained by subtracting the delay time from the second time when determination is made that the periodic deviation is not present. The abnormality diagnosis unit is configured to determine that the synchronization abnormality has occurred when determination is made that the periodic deviation is present or that the offset deviation is present.

An abnormality diagnosis method for solving the above problem is an abnormality diagnosis method for a vehicle control system including a master electronic control unit configured to output first time information serving as a reference, a plurality of slave electronic control units connected to the master electronic control unit via a network, and an abnormality diagnosis unit. The master electronic control unit and the slave electronic control units are configured to control a vehicle in cooperation. The abnormality diagnosis unit is configured to determine whether a synchronization abnormality has occurred between the first time information and second time information that is time information in each of the slave electronic control units.

The abnormality diagnosis method includes a step of causing the master electronic control unit and each of the slave electronic control units to transmit and receive signals to acquire a first time that is the first time information when the master electronic control unit transmits a first signal to the slave electronic control unit, a second time that is the second time information when the slave electronic control unit receives the first signal, a third time that is the second time information when the slave electronic control unit transmits a second signal to the master electronic control unit in response to reception of the first signal, a fourth time that is the first time information when the master electronic control unit receives the second signal, a fifth time that is the first time information when the master electronic control unit transmits a third signal to the slave electronic control unit in response to reception of the second signal, and a sixth time that is the second time information when the slave electronic control unit receives the third signal. The abnormality diagnosis method includes a step of calculating, by the slave electronic control unit, a delay time of transmission between the master electronic control unit and the slave electronic control unit based on the third time, the fourth time, the fifth time, and the sixth time. The abnormality diagnosis method includes a step of determining, by the abnormality diagnosis unit, whether a periodic deviation that is a deviation between a clock period in the master electronic control unit and a clock period in the slave electronic control unit is present based on a processing period in the master electronic control unit that is a difference obtained by subtracting the previously acquired first time from the current first time, and a processing period in the slave electronic control unit that is a difference obtained by subtracting the previously acquired second time from the current second time. The abnormality diagnosis method includes a step of determining, by the abnormality diagnosis unit, whether an offset deviation is present based on the first time and a difference obtained by subtracting the delay time from the second time when determination is made that the periodic deviation is not present. The abnormality diagnosis method includes a step of determining, by the abnormality diagnosis unit, that the synchronization abnormality has occurred when determination is made that the periodic deviation is present or that the offset deviation is present.

The vehicle control system can make the determination on the offset deviation without consideration of influence of the periodic deviation. Therefore, the calculation is facilitated. According to the vehicle control system, it is possible to reduce a processing load for the determination as to whether the synchronization abnormality has occurred.

According to the abnormality diagnosis method, it is possible to similarly reduce the processing load for the determination as to whether the synchronization abnormality has occurred.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
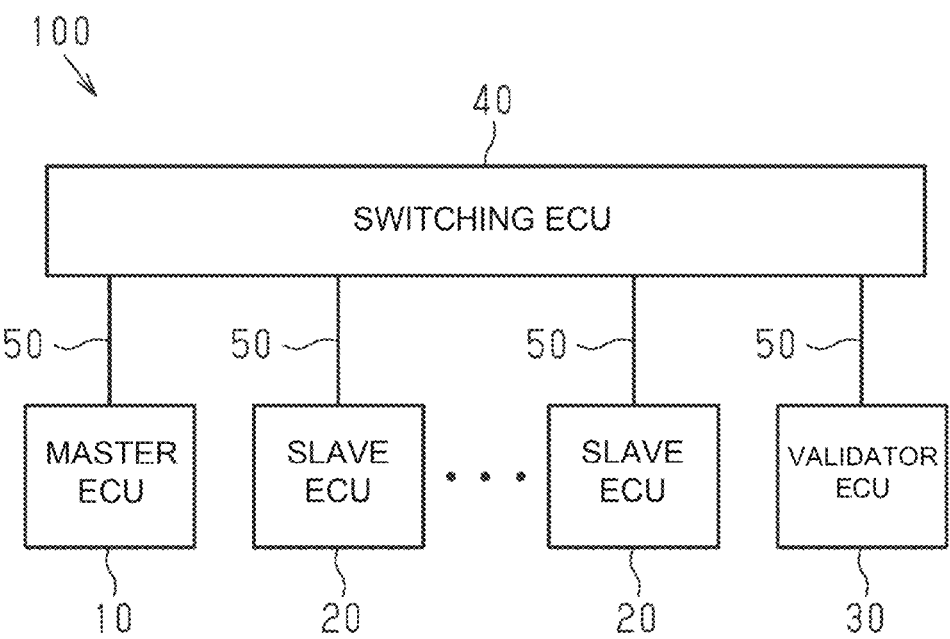
FIG. 1 is a block diagram illustrating a schematic configuration of an embodiment of a vehicle control system.

Hereinafter, an embodiment of a vehicle control system will be described with reference to FIGS. 1 to 4. FIG. 1 schematically illustrates a configuration of a vehicle control system 100 mounted on a vehicle such as an automobile. Configuration of the Vehicle Control System 100

As illustrated in FIG. 1, the vehicle control system 100 is configured by interconnecting a plurality of electronic control units via a network. In the following description, the electronic control unit is referred to as an ECU. The network in the vehicle control system 100 is, for example, Ethernet (registered trademark).

FIG. 1 illustrates a master ECU 10, a plurality of slave ECU 20, and a validator ECU 30 as a plurality of ECU. ECUs each include a processor and memories. The memory includes a memory storing a program executed by the processor and a memory temporarily storing data. The vehicle control system 100 realizes advanced vehicle control by coordinating the plurality of ECU connected via a network. Therefore, the vehicle control system 100 needs to monitor whether or not there is an error in the synchronization of the time information between ECU. The process for determining such synchronization abnormality is repeatedly executed in parallel with the vehicle control process.

As shown in FIG. 1, the network of the vehicle control system 100 includes a switching ECU 40 and a bus 50. Each of the master ECU 10, the slave ECU 20, and the validator ECU 30 is connected to a switching ECU 40 via a bus 50.

The master ECU 10 outputs the reference first time information. The respective slave ECU 20 is connected to the switching ECU 40 via busses 50. The slave ECU 20 acquires time information through communication with the master ECU 10 and calculates a delay time pDelay of transmission in the network. Then, the second time information obtained by performing the time synchronization using the delay time pDelay is outputted. The calculation of the delay-time pDelay will be described later.

The respective slave ECU 20 is an ECU for realizing various functions of the vehicles. For example, the slave ECU 20 is an engine ECU that controls the engine. The slave ECU 20 is a motor generator ECU that controls the motor generator. The slave ECU 20 is a brake ECU that controls the brake. The slave ECU 20 is a multimedia ECU that controls the car navigation system. The slave ECU 20 is a driving support ECU that realizes advanced driving support. The slave ECU 20 is a drive recorder ECU that controls the drive recorder.

Figure 2:
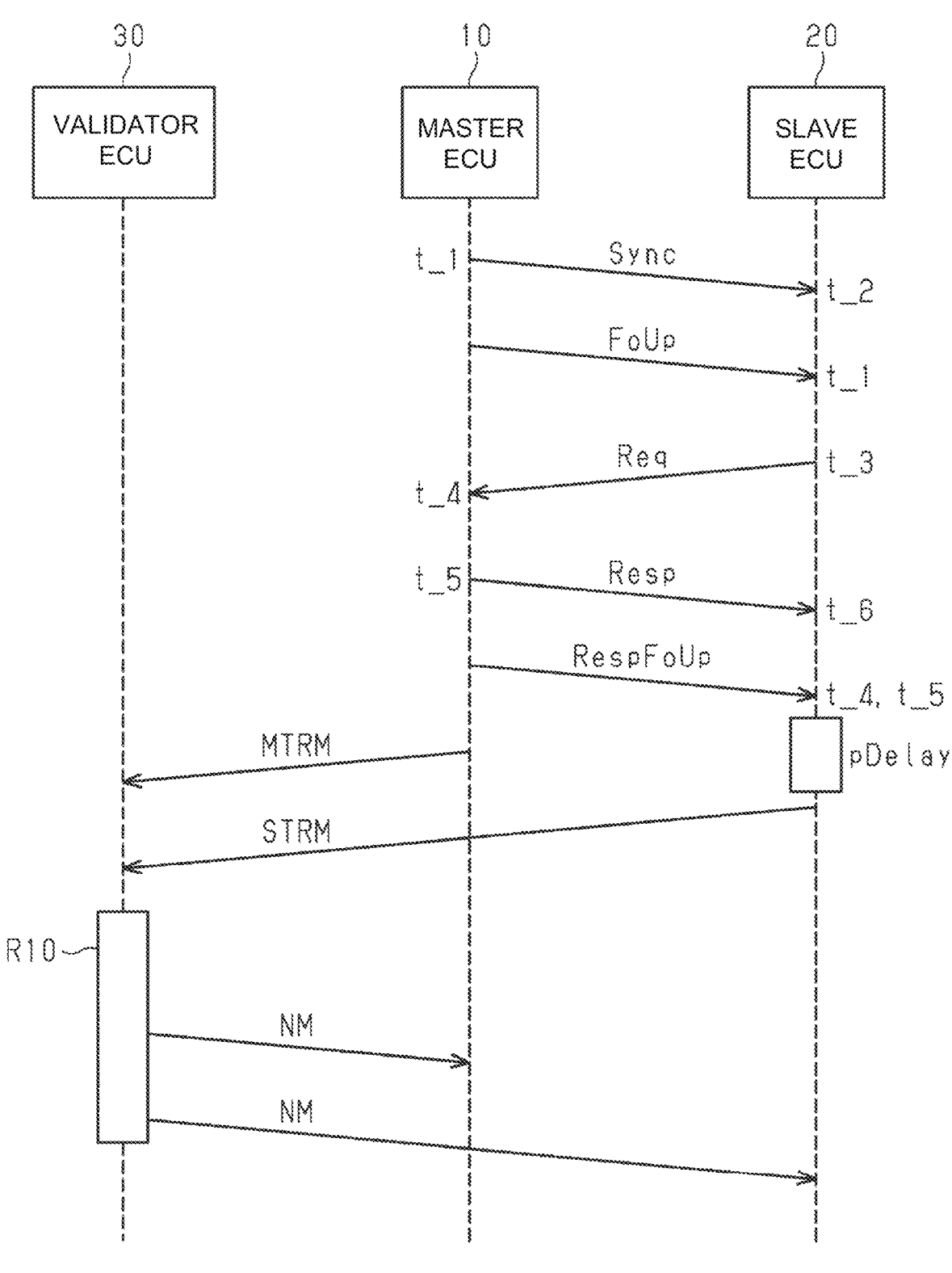
FIG. 2 is a sequential diagram illustrating the signaling of an anomaly diagnostics performed by the validator ECU.

The validator ECU 30 functions as an abnormality diagnosis unit that determines whether a synchronization abnormality between the first time information in the master ECU 10 and the second time information in the slave ECU 20 has occurred.
Diagnosing Synchronization Errors The vehicle control system 100 periodically exchanges signals between the master ECU 10 and the slave ECU 20, and acquires time information when a signal is transmitted and time information when a signal is received. Then, the validator ECU 30 periodically determines whether or not a synchronization error between the first time information and the second time information has occurred.
Flow of Signal Exchange for Abnormality Diagnosis FIG. 2 is a diagram illustrating a flow of communication between ECU for determining whether a synchronization error has occurred. During operation, the vehicle control system 100 periodically executes this sequence in parallel with the processing related to the control of the vehicle to execute abnormality diagnosis for determining the presence or absence of a synchronization abnormality. This sequencing is executed by the validator ECU 30, the master ECU 10, and each of the plurality of slave ECU 20.

As shown in FIG. 2, the master ECU 10 transmits the first signaling Sync to the slave ECU 20. The master ECU 10 acquires, as the first time t_1, the first time information when the first signaling Sync is transmitted. As described above, the first time information is reference time information in vehicle control and time synchronization. The first time information is time information measured by the master ECU 10. Upon receiving the first signal Sync, the slave ECU 20 acquires the second time at which the first signal Sync is received as the second time t_2. The second time information is time information measured by the slave ECU 20.

When the master ECU 10 transmits the first signal Sync to the slave ECU 20, it transmits the fourth signal FoUp to the slave ECU 20. Here, the time stamp at the first time t_1 is transmitted as the fourth signal FoUp. By receiving the fourth signal FoUp, the slave ECU 20 acquires the information at the first time t_1.

Upon receiving the first signal Sync, the slave ECU 20 transmits a second signal Req to the master ECU 10. The slave ECU 20 acquires the second time at which the second signal Req is transmitted as the third time t_3. Upon receiving the second signal Req, the master ECU 10 acquires the first time at which the second signal Req is received as the fourth time t_4.

Upon receiving the second signal Req, the master ECU 10 transmits a third signal Resp to the slave ECU 20. The master ECU 10 acquires the first time at which the third signaling Resp is transmitted as the fifth time t_5. Upon receiving the third signal Resp, the slave ECU 20 acquires the second time at which the third signal Resp is received as the sixth time.

When the third signal Resp is transmitted to the slave ECU 20, the master ECU 10 transmits the fifth signal RespFoUp to the slave ECU 20. Here, the time stamp at the fourth time t_4 and the time stamp at the fifth time t_5 are transmitted as the fifth signaling RespFoUp. By receiving the fifth signal RespFoUp, the slave ECU 20 acquires the information at the fourth time t_4 and the information at the fifth time t_5.

The slave ECU 20 that has acquired the sixth time t_6 and received the fifth signal RespFoUp calculates the delay time pDelay. The delay time pDelay is the time of the transmission delay between the master ECU 10 and the slave ECU 20. The slave ECU 20 calculates the delay time pDelay based on the third time t_3, the fourth time t_4, the fifth time t_5, and the sixth time t_6. Specifically, in the process of calculating the delay time pDelay, the slave ECU 20 calculates a first difference that is a difference obtained by subtracting the third time t_3 from the sixth time t_6. Further, the slave ECU 20 calculates a second difference that is a difference obtained by subtracting the fourth time t_4 from the fifth time t_5. Then, the slave ECU 20 calculates a quotient obtained by dividing the difference obtained by subtracting the second difference from the first difference by 2. This quotient is the delay-time pDelay.

The master ECU 10 that has transmitted the fifth signaling RespFoUp to the slave ECU 20 transmits the master timing record message MTRM to the validator ECU 30. The master timing record message MTRM includes the sequence ID of the transmitted first signal Sync, the time stamp at the first time t_1, the time stamp at the fourth time t_4, and the time stamp at the fifth time t_5. The master timing record message MTRM also includes a self-diagnosis status indicating whether the master ECU 10 is operating normally.

The slave ECU 20 that has calculated the delay pDelay transmits the slave timing record message STRM to the validator ECU 30. The slave timing record message STRM includes ID of the slave ECU 20, the sequence ID of the received first signal Sync, the sequence ID of the received fourth signal FoUp, and the sequence ID of the received fifth signal RespFoUp. The slave timing record message STRM includes a time stamp at the second time t_2, a time stamp at the third time t_3, and a time stamp at the sixth time t_6. Further, the slave timing record message STRM includes a delay pDelay and a self-diagnosis status indicating whether the slave ECU 20 is operating normally.

The validator ECU 30 that has received the master timing record message MTRM and the slave timing record message STRM executes the anomaly diagnostic routine R10.

Diagnostic Routine

Figure 3:
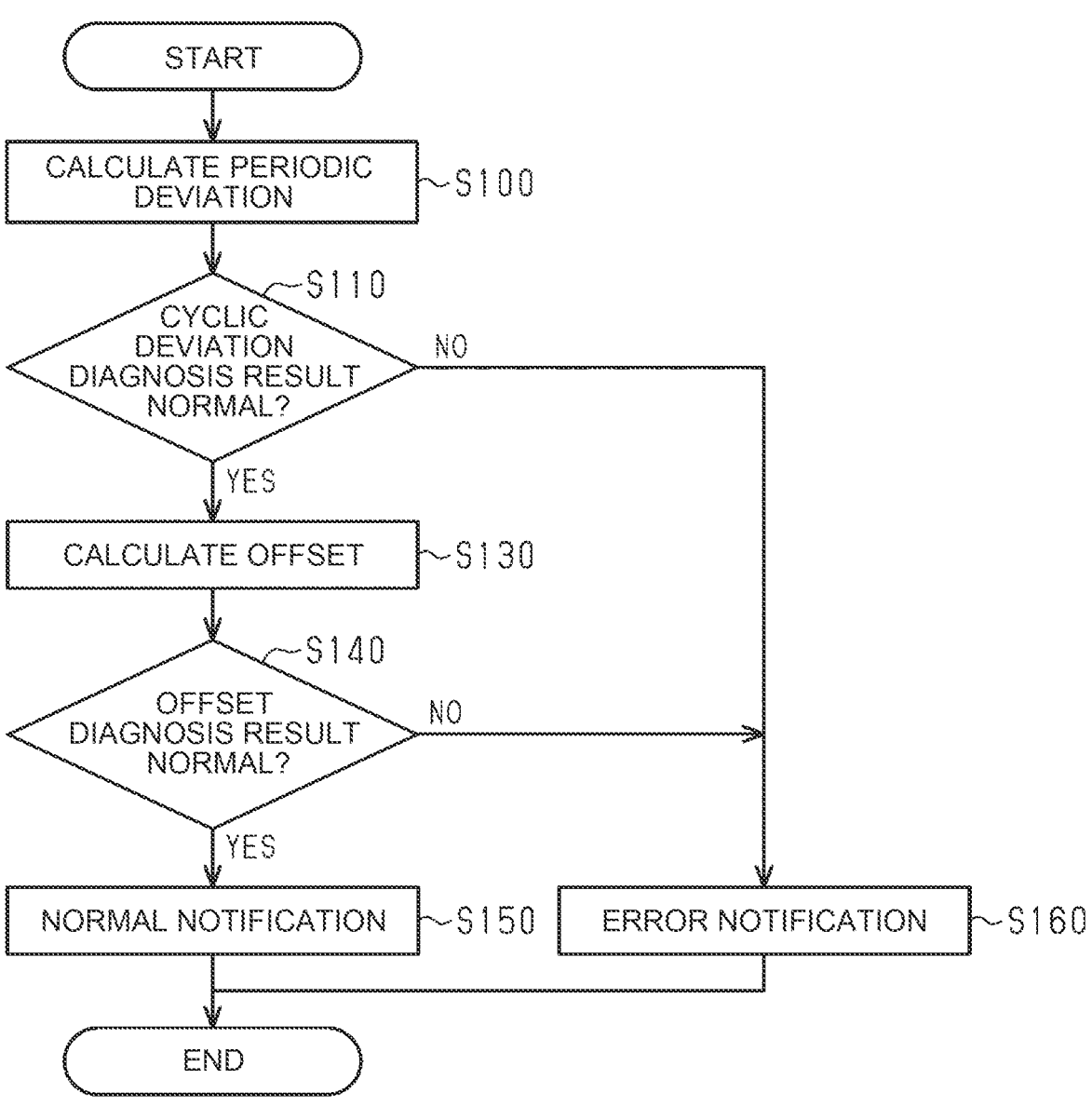
FIG. 3 is a flow chart showing a flow of a process performed by the validator ECU in the anomaly diagnostic routine.

As illustrated in FIG. 3, when the anomaly diagnostic routine R10 is started, the validator ECU 30 first calculates a periodic deviation in S100 process. Specifically, the validator ECU 30 calculates the third difference obtained by subtracting the first time t_1 acquired in the sequence executed last time from the first time t_1 acquired in the sequence executed this time. This third difference corresponds to the cycle of the process in the master ECU 10. Further, the validator ECU 30 calculates a fourth difference obtained by subtracting the second time t_2 acquired in the sequence executed last time from the second time t_2 acquired in the sequence executed this time. This fourth difference corresponds to the cycle of the process in the slave ECU 20. Then, the validator ECU 30 calculates an absolute value of the difference obtained by subtracting the fourth difference from the third difference. This absolute value is a value corresponding to the period deviation.

When the periodic deviation is calculated in this way, the validator ECU 30 advances the process to S110. Then, in S110 process, the validator ECU 30 determines whether or not there is a periodic shift. Specifically, the validator ECU 30 determines that there is a periodic deviation when the value of the calculated absolute value is equal to or larger than the threshold value. The threshold value is a value for determining that there is a periodic deviation based on the fact that the value of the absolute value is equal to or larger than the threshold value. The magnitude of the threshold value is set based on an allowable range as the magnitude of the period deviation.

The validator ECU 30 advances the process to S160 when it is determined that there is a periodic deviation, that is, when it indicates that the periodic deviation is abnormal (S110:NO). In this case, the validator ECU 30 determines that a synchronization error has occurred, and notifies that a synchronization error has occurred in the master ECU 10 and the respective slave ECU 20 in S160 process. As illustrated in FIG. 2, the validator ECU 30 transmits notification message NM to the master ECU 10 and the respective slave ECU 20 in the anomaly diagnostic routine R10. The notification message NM is a message for notifying the outcome of the error diagnosis by the validator ECU 30. The notification message NM includes information indicating the status of the master ECU 10 and information indicating the presence or absence of a synchronization error with the respective slave ECU 20. That is, in S160 process, the validator ECU 30 transmits, to the master ECU 10 and the slave ECU 20, notification message NM including information indicating that a synchronization error has occurred between the master ECU 10 and the slave ECU 20.

On the other hand, if the validator ECU 30 determines that there is no periodic deviation, that is, if it indicates that the periodic deviation is normal (S110:YES), the process proceeds to S130. Then, the validator ECU 30 calculates the offset between the first time information and the second time information in S130 process. Specifically, the validator ECU 30 calculates a fifth difference obtained by subtracting the delay time pDelay from the second time t_2. Then, the validator ECU 30 calculates the absolute value of the difference obtained by subtracting the fifth difference from the first time t_1. This absolute value is an offset.

When the offset is calculated in this manner, the validator ECU 30 advances the process to S140. Then, in S140 process, the validator ECU 30 determines whether or not there is an offset deviation. Specifically, the validator ECU 30 determines that there is an offset deviation when the calculated offset is greater than or equal to a threshold. The threshold value is a value for determining that there is an offset deviation based on the fact that the value of the offset is equal to or larger than the threshold value. The magnitude of the threshold value is set based on an acceptable range as the magnitude of the offset deviation.

If the validator ECU 30 determines that there is an offset deviation, that is, if it indicates that the offset deviation is abnormal (S140:NO), the process proceeds to S160. Also, the validator ECU 30 determines that a synchronization error has occurred, and notifies the master ECU 10 and the respective slave ECU 20 that a synchronization error has occurred in S160 process. That is, the validator ECU 30 transmits, to the master ECU 10 and the slave ECU 20, notification message NM including information indicating that a synchronization error has occurred between the master ECU 10 and the slave ECU 20.

On the other hand, if the validator ECU 30 determines that there is no offset deviation, that is, if it indicates that the offset deviation is normal (S140: YES), the process proceeds to S150. In this case, the validator ECU 30 determines that no synchronization abnormality has occurred, and notifies that no synchronization abnormality has occurred in the master ECU 10 and the respective slave ECU 20 in S150 process. That is, the validator ECU 30 transmits, to the master ECU 10 and the slave ECU 20, notification message NM including information indicating that no synchronization error has occurred between the master ECU 10 and the slave ECU 20.

When the notification message NM is transmitted to the master ECU 10 and the slave ECU 20 through S150 process or S160 process, the validator ECU 30 terminates the routine.

In the vehicle control system 100, the presence or absence of the synchronization abnormality is monitored by repeatedly executing the sequence illustrated in FIG. 2.

Frame Format

Figure 4:
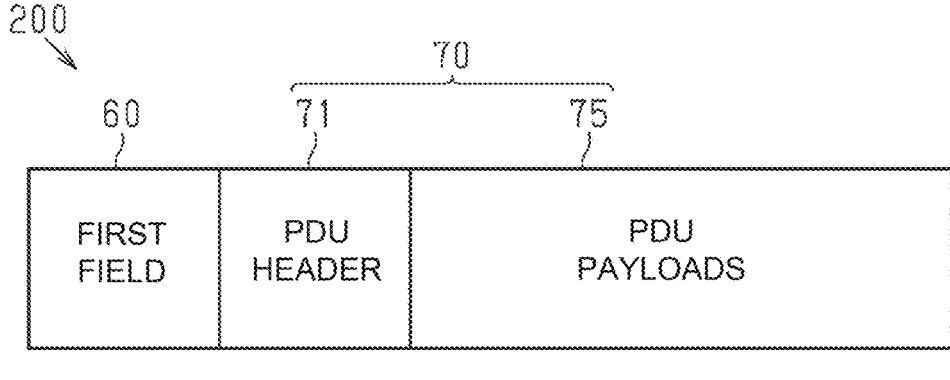
FIG. 4 is a schematic diagram illustrating frame formats used for communication between master ECU and respective slave ECU and validator ECU.
Figure 4:
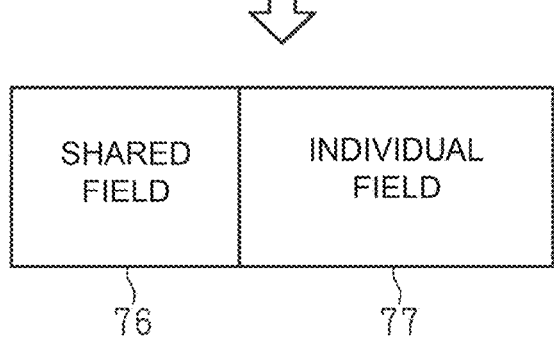

FIG. 4 schematically illustrates the formats of a frame 200 used for data communication between the validator ECU 30 and the master ECU 10 and data communication between the validator ECU 30 and the respective slave ECU 20. The master timing record message MTRM, slave timing record message STRM, and notification message NM are transmitted by frame 200 in accordance with this format.

As shown in FIG. 4, the frame 200 includes a first field 60 and a second field 70. The first field 60 stores information such as IP addresses, UDP headers, and the like. The second field 70 is divided into PDU headers 71 and PDU payloads 75. Further, PDU payload 75 is divided into a shared field 76 and an individual field 77.

The master timing record message MTRM is a frame 200 in which the sequence ID of the transmitted first signal Sync, the time stamp at the first time t_1, the time stamp at the fourth time t_4, and the time stamp at the fifth time t_5 are stored in the individual field 77.

The slave timing record message STRM is a frame 200 in which the following data is stored in the individual field 77.

In ID of the slave ECU 20, the sequence ID of the received first signal Sync, the sequence ID of the fourth signal FoUp, and the sequence ID of the fifth signal RespFoUp.

The time stamp at the second time t_2, the time stamp at the third time t_3, and the time stamp at the sixth time t_6.

The delay pDelay and the self-diagnostic status indicating whether the slave ECU 20 is operating normally.

The notification message NM is a frame 200 in which information indicating the status of the master ECU 10 and information on the presence or absence of a synchronization error with the respective slave ECU 20 are stored in the individual field 77.

Operation of this Embodiment

Synchronization abnormality may occur due to overlapping of periodic deviation and offset deviation. The cycle deviation is a deviation between the clock cycle in the master ECU 10 and the clock cycle in the slave ECU 20. The offset deviation is an offset between the first time information and the second time information that occurs even when the clock periods are uniform. That is, the offset deviation is a deviation between the execution timing of the processing in the master ECU 10 and the execution timing of the processing in the slave ECU 20, excluding the deviation of the clock period.

In the above-described vehicle control system 100, the validator ECU 30 determines the presence or absence of the offset deviation by using the fifth difference obtained by subtracting the delay time pDelay from the second time t_2 after determining that there is no periodic deviation. The fifth difference obtained by subtracting the delay time pDelay from the second time t_2 should be equal to the first time t_1 when there is no cycle shift or offset shift and no synchronization error occurs.

The validator ECU 30 determines the presence or absence of the offset deviation based on the fifth difference and the first time t_1 after determining that there is no periodic deviation. That is, in this calculation method, it is not necessary to consider the influence of the periodic deviation in the determination of the presence or absence of the offset deviation.

As described above, the vehicle control system 100 performs the determination of the presence or absence of the periodic shift first, determines that there is no periodic shift, and then determines the presence or absence of the offset shift. Then, the validator ECU 30 determines that a synchronization error has occurred when it is determined that there is a periodic deviation or when it is determined that there is an offset deviation.

Effect of this Embodiment (1) The vehicle control system 100 can determine the offset deviation without considering the influence of the periodic deviation. Therefore, the calculation becomes easy. Therefore, according to the vehicle control system 100, it is possible to suppress a processing load for determining whether a synchronization abnormality has occurred.

(2) As illustrated in FIG. 2, the vehicle control system 100 performs the steps of transmitting and receiving signals between the master ECU 10 and the slave ECU 20 to acquire the sixth time t_6 from the first time t_1. Then, the slave ECU 20 executes the steps of calculating the delay time pDelay of the transmission between the master ECU 10 and the slave ECU 20 based on the third time t_3, the fourth time t_4, the fifth time t_5, and the sixth time t_6.

The validator ECU 30 performs the steps of determining whether there is a periodic shift that is a deviation between the clock cycle in the master ECU 10 and the clock cycle in the slave ECU 20 based on the third difference and the fourth difference (S110).

Then, when it is determined that there is no periodic deviation (S120: YES), the validator ECU 30 executes steps of determining whether or not there is an offset deviation based on the fifth difference and the first time t_1 (S140).

Then, the validator ECU 30 executes steps of determining that a synchronization error has occurred when it is determined that there is a periodic deviation (S110:NO) or when it is determined that there is an offset deviation (S140:NO) (S160).

According to such an abnormality diagnosis method, it is possible to suppress a processing load for determining whether or not a synchronization abnormality has occurred as described in (1).

(3) The slave ECU 20 calculates a first difference obtained by subtracting the third time t_3 from the sixth time t_6 and a second difference obtained by subtracting the fourth time t_4 from the fifth time t_5. Then, the slave ECU 20 calculates the quotient obtained by dividing the difference obtained by subtracting the second difference from the first difference by 2 as the delay-time pDelay. The vehicle control system 100 can thus calculate the delay-time pDelay.

(4) The validator ECU 30 determines that there is a periodic deviation when the absolute value of the difference obtained by subtracting the fourth difference from the third difference is equal to or larger than the threshold value. Thus, the validator ECU 30 can determine that there is a periodic deviation when the difference between the third difference obtained by subtracting the first time t_1 acquired last time from the first time t_1 and the fourth difference obtained by subtracting the second time t_2 acquired last time from the second time t_2 is equal to or higher than a predetermined level.

(5) The slave ECU 20 determines that there is an offset deviation when the absolute value of the difference obtained by subtracting the fifth difference from the first time t_1 is equal to or larger than the threshold value. Thus, the validator ECU 30 can determine that there is an offset deviation when the difference between the fifth difference obtained by subtracting the delay time pDelay from the second time t_2 and the first time t_1 is equal to or higher than the predetermined level.

Example of Change

The present embodiment can be modified as follows. The present embodiment and the following modification examples can be combined with each other as long as they are not technically contradictory.

In the above embodiment, the master ECU 10, the slave ECU 20, and the validator ECU 30 are connected to the switching ECU 40 via the bus 50. The configuration of the vehicle control system 100 is not limited to such a configuration.

Figure 5:
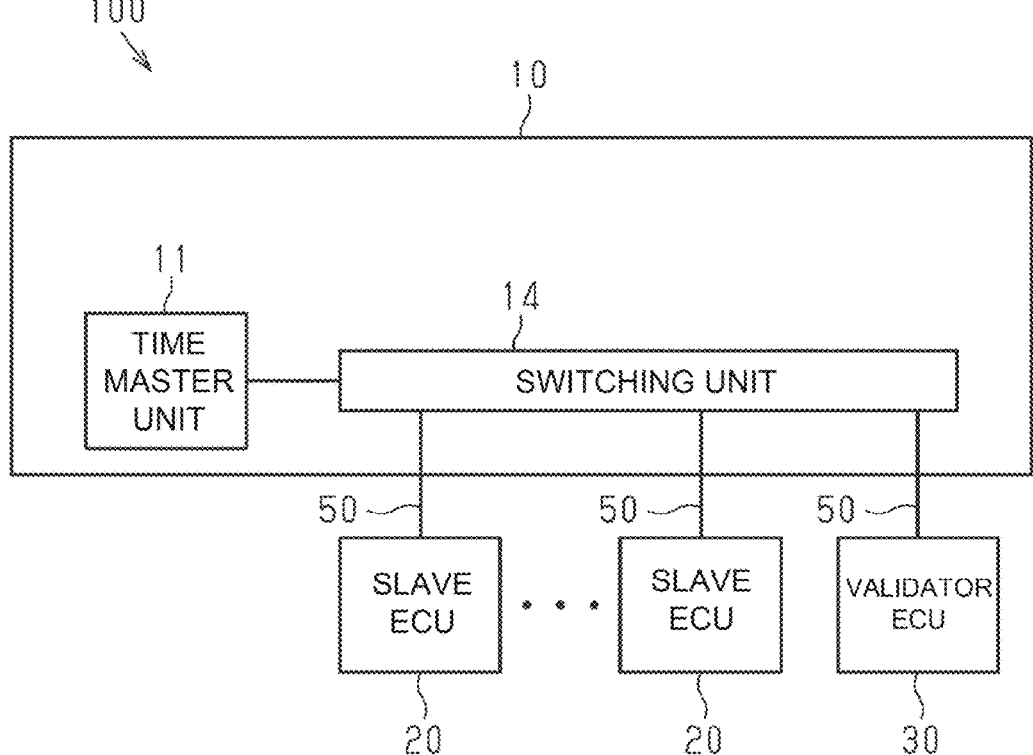
FIG. 5 is a block-diagram illustrating a modification of the vehicle control system.

For example, as illustrated in FIG. 5, the vehicle control system 100 may have a configuration in which the master ECU 10 includes a time master unit 11 and a switching unit 14. The time master unit 11 is, for example, a virtual machine configured on the master ECU 10, and is a functional unit that functions similarly to the master ECU 10 in the above-described embodiment. Further, the switching unit 14 is a virtual machine configured on the master ECU 10, and is a functional unit that functions similarly to the switching ECU 40 in the above-described embodiment.

Figure 6:
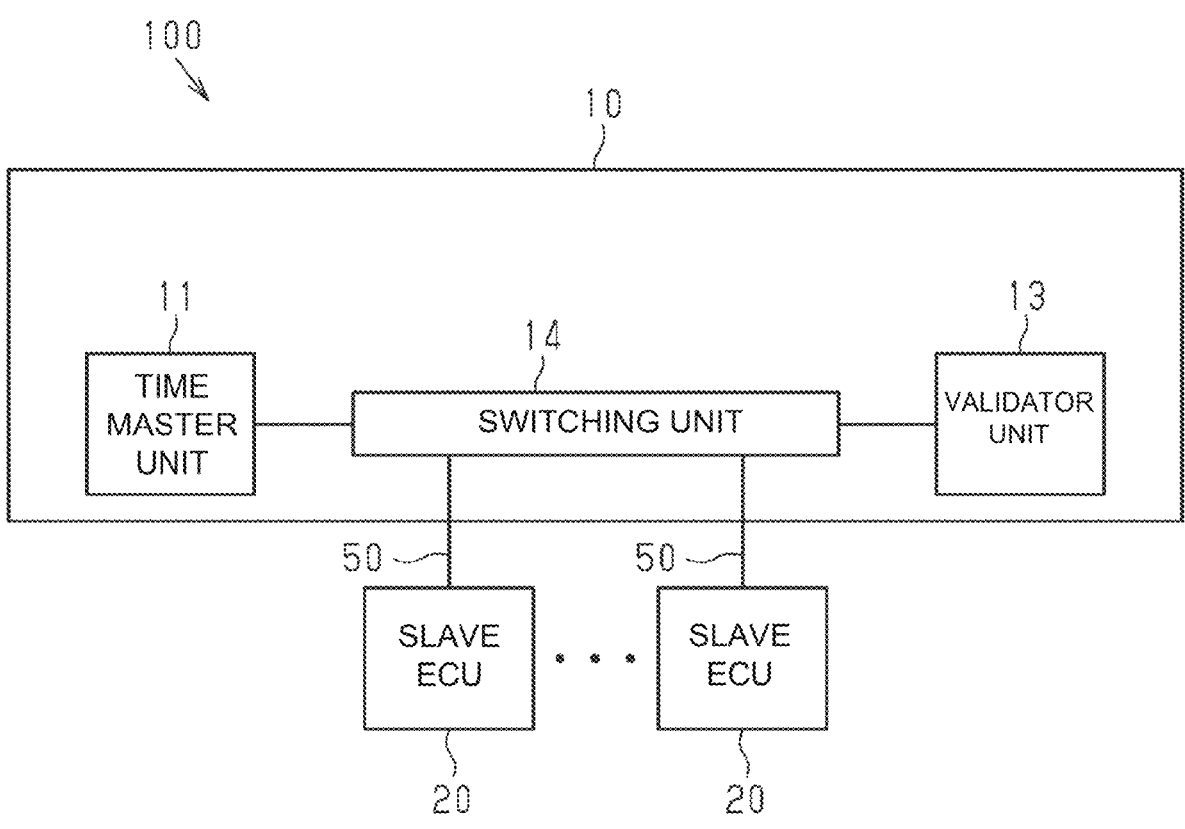
FIG. 6 is a block diagram illustrating another modification of the vehicle control system.

As illustrated in FIG. 6, the vehicle control system 100 may have a configuration in which the master ECU 10 includes a time master unit 11, a switching unit 14, and a validator unit 13. The validator unit 13 is, for example, a virtual machine configured on the master ECU 10, and is a functional unit that functions similarly to the validator ECU 30 in the above-described embodiment.

Even when these configurations are adopted, the same effects as those of the above-described embodiment can be obtained.

In the above embodiment, an example has been described in which it is determined that there is a periodic deviation based on the fact that the absolute value of the difference obtained by subtracting the fourth difference from the third difference is equal to or larger than the threshold value. On the other hand, the method of determining the periodic deviation may be any method that determines that there is a periodic deviation when the deviation between the cycle of the process in the master ECU 10 and the cycle of the process in the slave ECU 20 is equal to or higher than a predetermined level. Therefore, the method of determining the periodic deviation is not limited to the method exemplified in the above-described embodiment. For example, a method of determining that there is a periodic deviation based on the fact that the value of the ratio between the third difference and the fourth difference does not fall within an allowable range centered on 1.0 may be employed.

In the above embodiment, an example is shown in which it is determined that there is an offset deviation based on the fact that the absolute value of the difference obtained by subtracting the fifth difference from the first time t_1 is equal to or larger than the threshold value. On the other hand, the offset deviation determination method may be any method that determines that there is an offset deviation when the difference between the fifth difference obtained by subtracting the delay time pDelay from the second time t_2 and the first time t_1 is equal to or higher than a predetermined level. Therefore, the method of determining the offset deviation is not limited to the method illustrated in the above-described embodiment. For example, it is also possible to adopt a method of determining that there is an offset deviation based on the fact that the value of the ratio between the first time t_1 and the fifth difference does not fall within an allowable range centered on 1.0.

What is claimed is:

1. A vehicle control system comprising:

a master electronic control unit configured to output first time information serving as a reference;

a plurality of slave electronic control units connected to the master electronic control unit via a network, the master electronic control unit and the slave electronic control units being configured to control a vehicle in cooperation; and an abnormality diagnosis unit configured to determine whether a synchronization abnormality has occurred between the first time information and second time information that is time information in each of the slave electronic control units, wherein the vehicle control system is configured to:

cause the master electronic control unit and each of the slave electronic control units to transmit and receive signals to acquire a first time that is the first time information when the master electronic control unit transmits a first signal to the slave electronic control unit, a second time that is the second time information when the slave electronic control unit receives the first signal, a third time that is the second time information when the slave electronic control unit transmits a second signal to the master electronic control unit in response to reception of the first signal, a fourth time that is the first time information when the master electronic control unit receives the second signal, a fifth time that is the first time information when the master electronic control unit transmits a third signal to the slave electronic control unit in response to reception of the second signal, and a sixth time that is the second time information when the slave electronic control unit receives the third signal; and calculate a delay time of transmission between the master electronic control unit and the slave electronic control unit based on the third time, the fourth time, the fifth time, and the sixth time, and the abnormality diagnosis unit is configured to:

determine whether a periodic deviation that is a deviation between a clock period in the master electronic control unit and a clock period in the slave electronic control unit is present based on a processing period in the master electronic control unit that is a difference obtained by subtracting the previously acquired first time from the current first time, and a processing period in the slave electronic control unit that is a difference obtained by subtracting the previously acquired second time from the current second time;

determine whether an offset deviation is present based on the first time and a difference obtained by subtracting the delay time from the second time when determination is made that the periodic deviation is not present; and determine that the synchronization abnormality has occurred when determination is made that the periodic deviation is present or that the offset deviation is present.

2. The vehicle control system according to claim 1, wherein the slave electronic control unit is configured to calculate, as the delay time, a quotient obtained such that a difference obtained by subtraction between a first difference obtained by subtracting the third time from the sixth time and a second difference obtained by subtracting the fourth time from the fifth time is divided by two.

3. The vehicle control system according to claim 1, wherein the abnormality diagnosis unit is configured to determine that the periodic deviation is present when a deviation between the processing period in the master electronic control unit that is the difference obtained by subtracting the previously acquired first time from the current first time and the processing period in the slave electronic control unit that is the difference obtained by subtracting the previously acquired second time from the current second time is equal to or larger than a predetermined level.

4. The vehicle control system according to claim 1, wherein the abnormality diagnosis unit is configured to determine that the offset deviation is present when a deviation between the first time and the difference obtained by subtracting the delay time from the second time is equal to or larger than a predetermined level.

5. An abnormality diagnosis method for a vehicle control system including a master electronic control unit configured to output first time information serving as a reference, a plurality of slave electronic control units connected to the master electronic control unit via a network, and an abnormality diagnosis unit, the master electronic control unit and the slave electronic control units being configured to control a vehicle in cooperation, the abnormality diagnosis unit being configured to determine whether a synchronization abnormality has occurred between the first time information and second time information that is time information in each of the slave electronic control units, the abnormality diagnosis method comprising:

a step of causing the master electronic control unit and each of the slave electronic control units to transmit and receive signals to acquire a first time that is the first time information when the master electronic control unit transmits a first signal to the slave electronic control unit, a second time that is the second time information when the slave electronic control unit receives the first signal, a third time that is the second time information when the slave electronic control unit transmits a second signal to the master electronic control unit in response to reception of the first signal, a fourth time that is the first time information when the master electronic control unit receives the second signal, a fifth time that is the first time information when the master electronic control unit transmits a third signal to the slave electronic control unit in response to reception of the second signal, and a sixth time that is the second time information when the slave electronic control unit receives the third signal;

a step of calculating, by the slave electronic control unit, a delay time of transmission between the master electronic control unit and the slave electronic control unit based on the third time, the fourth time, the fifth time, and the sixth time;

a step of determining, by the abnormality diagnosis unit, whether a periodic deviation that is a deviation between a clock period in the master electronic control unit and a clock period in the slave electronic control unit is present based on a processing period in the master electronic control unit that is a difference obtained by subtracting the previously acquired first time from the current first time, and a processing period in the slave electronic control unit that is a difference obtained by subtracting the previously acquired second time from the current second time;

a step of determining, by the abnormality diagnosis unit, whether an offset deviation is present based on the first time and a difference obtained by subtracting the delay time from the second time when determination is made that the periodic deviation is not present; and a step of determining, by the abnormality diagnosis unit, that the synchronization abnormality has occurred when determination is made that the periodic deviation is present or that the offset deviation is present.

* * * * *